Patented Mar. 23, 1943

2,314,379

UNITED STATES PATENT OFFICE 2,314,379

PROCESS FOR PRODUCING PARA-HYDROXYARYLSULPHONES

Werner Zerweck and Walter Brunner, Frankfort-on-the-Main-Fechenheim, Germany, assignors to General Aniline & Film Corporation, New York, N. Y., a corporation of Delaware No Drawing. Application October 8, 1940, Serial No. 360,238. In Germany November 4, 1939

1 Claim. (Cl. 260—607)

Our present invention relates to a process for producing para-hydroxyarylsulphones of the general formula:

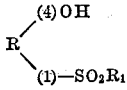

wherein R stands for a member of the group consisting of radicles of the benzene and naphthalene series, $R_1$ for a member of the group consisting of alkyl, aryl of the benzene series, aralkyl and cycloalkyl radicles. The present process consists in subjecting para-halogenoarylsulphones of the general formula:

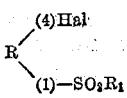

wherein R and $R_1$ have the aforesaid signification, to the action of a caustic alkali in the heat.

The present process yields the hydroxycompounds with an almost theoretical yield without the formation of by-products, a fact which is surprizing in view of the well known difficulties of converting chlorobenzene into phenol.

The aforesaid halogenoarylsulphones may be easily prepared with an excellent yield for instance by starting on the one side from halogeno-aryl-para-sulphochlorides, converting them into salts of the corresponding sulphinic acids and acting thereupon with an alkylating or arylating agent.

On the other side one may react either on para-halogenoaryl-sulphochlorides with hydrocarbons or on not halogenated aryl- or alkylsulphochlorides with halogenated aromatic hydrocarbons in the presence of a condensing agent such as aluminium chloride.

Hydroxyarylsulphones have been hitherto produced only by complicated methods, such as by saponifying the corresponding phenolethers (Chem. Zentralblatt, 1938, vol. II, page 1766), for the production of which a previous conversion of phenols into phenolethers before the introduction of the sulphone group is necessary, or by conversion of the diazocompounds of the corresponding aminoarylsulphones (Journ. of Americ. Chem. Society, vol. 46, page 2335) which are obtainable from the halogenoarylsulphones, or by acting with fluorsulphonic acid on phenols and acting on the formed sulphofluoride with hydrocarbons in the presence of aluminium chloride (Journ. f. prakt. Chemie, vol. 117, page 60). All of these methods are complicated and are characterised by an insufficient yield. The present process is therefore of a substantial technical value.

In order to further illustrate our invention, the following examples are given, the parts being by weight and all temperatures in degrees centigrade.

Example 1

A mixture of 10 parts of 4-chlorophenylmethylsulphone, 10 parts of caustic potash and 100 to 150 parts of water is heated for some hours in a closed vessel at 200 to 220° The formed solution is evaporated until the separation of the cristalline potassium salt begins. By acidification the 4-hydroxyphenylmethylsulphone of the formula:

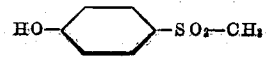

is obtained. It melts at 96° (Chem. Zentralbl., vol. II, page 1766).

The reaction may be likewise carried out by heating for about 72 hours a mixture 10 parts of 4-chlorophenylmethylsulphone, 60 parts of caustic potash and about 150 parts of water to boiling.

The aforesaid 4-chlorophenylmethylsulphone may be prepared for instance by methylation of the sulphinic acid formed by reducing the para-chlorobenzene sulphochloride.

Example 2

A mixture of 45 parts of 4-bromodiphenylsulphone, 45 parts of caustic potash and about 600 parts of water is heated in a close vessel for about 20 hours at 210 to 220°. The formed solution is purified by filtration and acidified. In this manner the 4-hydroxydiphenylsulphone of the formula:

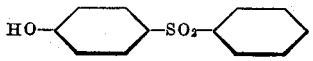

melting at 133 to 134° is obtained.

When heating to boiling for about 72 hours a mixture of 15 parts of 4-chlorodiphenylsulphone, 90 parts of caustic potash and about 225 parts of water, the same product of decomposition is obtained.

The aforesaid 4-bromodiphenylsulphone may be prepared for instance by acting with benzene on para-bromobenzenesulphochloride or with bromobenzene on benzenesulphochloride both in the presence of aluminium chloride.

Example 3

A mixture of 60 parts of 4-chlorophenylbenzylsulphone, 60 parts of caustic potash and about 600 parts of water is heated for about 10 hours at about 200° in a close vessel. By acidifying the formed solution the 4-hydroxphenylbenzylsulphone of the formula:

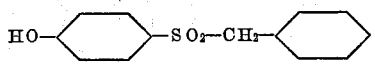

of 208° melting point is obtained.

*Example 4*

A mixture of 37 parts of 4-chlorophenylcyclohexyl-sulphone, 37 parts of caustic potash and about 600 parts of water is heated at about 200° for about 10 hours.

In this manner the 4-hydroxyphenylcyclohexyl-sulphone of the formula:

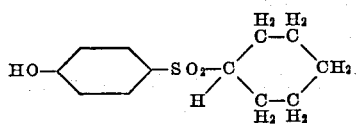

of 180° melting point is obtained.

*Example 5*

When heating for about 10 hours in a close vessel at 190 to 195° a mixture of 22.5 parts of 3.4-dichloro-phenylmethylsulphone, 12 parts of caustic potash and about 25 parts of water the 4-hydroxy-3-chlorophenylmethylsulphone of the formula:

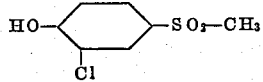

of 160 to 161° melting point is obtained.

*Example 6*

A mixture of 45.5 parts of 3.4-dichloro-diphenylsulphone, 19 parts of caustic potash and about 400 parts of water is heated for about 8 hours in a close vessel at 200 to 205°. By acidifying the formed solution the 4-hydroxy-3-chlorodiphenylsulphone of the formula:

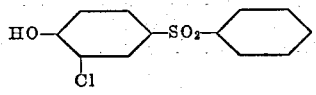

of 176° melting point is obtained.

*Example 7*

When heating a mixture of 58 parts of 4-chloro-4'-methyldiphenylsulphone, 40 parts of caustic soda and about 400 parts of water in a close vessel for about 9 hours at 200 to 205° the 4-hydroxy-4'-methyldiphenylsulphone of the formula:

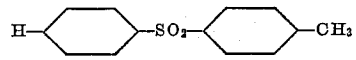

of 138° melting point is obtained.

*Example 8*

A mixture of 40 parts of 4-chloro-naphthyl-1-phenyl-sulphone, 40 parts of caustic potash and about 400 parts of water is heated in a close vessel for about 10 hours at about 200°. By acidifying the formed solution the 4-hydroxynaphthyl-phenyl-sulphone of the formula:

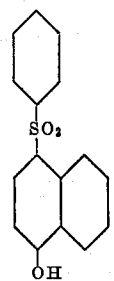

of about 107° melting point is obtained.

The aforesaid 4-chloro-1-phenylnaphthylsulphone may be prepared by acting with diazobenzenechloride on 4-chloro-1-thionaphthol according to Ziegler (Ber. Deutsche Chem. Ges., vol. 23, page 2469) and oxidizing the formed 4'-chloro-naphthyl-1-phenylthioether for instance by means of hydrogen peroxide.

We claim:

Process for producing para-hydroxyarylsulphones of the general formula:

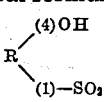

wherein R stands for a member of the group consisting of benzene and naphthalene radicles, $R_1$ for a member of the group consisting of alkyl, a phenyl, aralkyl and cycloalkyl radicles which process consists in heating a parahalogeno-arylsulphone of the general formula:

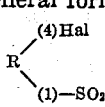

wherein R and $R_1$ have the aforesaid significance and Hal represents halogen to a temperature of between 190 and 220° C. under autogenous pressure with caustic potash.

WERNER ZERWECK.
WALTER BRUNNER.

Certificate of Correction

Patent No. 2,314,379.   March 23, 1943.

WERNER ZERWECK ET AL.

It is hereby certified that errors appear in the printed specification of the above numbered patent requiring correction as follows: Page 2, second column, lines 3 to 5 inclusive, for that portion of the formula reading

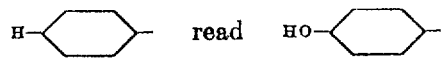

line 14, for "naphthyl-phenyl-sulphone" read *naphthyl-1-phenyl-sulphone*; and that the said Letters Patent should be read with these corrections therein that the same may conform to the record of the case in the Patent Office.

Signed and sealed this 22nd day of June, A. D. 1943.

[SEAL]

HENRY VAN ARSDALE,
*Acting Commissioner of Patents.*